Patented Apr. 4, 1939

2,152,741

UNITED STATES PATENT OFFICE 2,152,741

CATIVIC ACID ESTERS AND METHODS OF PREPARING THEM

Nicholas L. Kalman, Cambridge, Mass.

No Drawing. Application July 29, 1935,
Serial No. 33,661

12 Claims. (Cl. 260—103)

This invention relates especially to esters of the organic acid herein defined, also to methods for preparing these esters. This application is a continuation in part of my application Ser. No. 611,113 filed May 13, 1932, for Solvents.

Certain features of this invention also relate to the said organic acid and the preparation thereof, to which acid or mixture of isomeric acids, I have given the name cativic acid for purposes of ready differentiation from other compounds, and which acid may be prepared, isolated and purified in any of the various ways set forth below. In this connection I refer also to my copending application Ser. No. 594,925 filed February 24, 1932, for Solvents which is directed primarily to cativic acid and to compositions containing cativic acid and/or cativo resin. I also refer to my copending applications Ser. No. 611,114 filed May 13, 1932, for Solvents for cellulose derivatives, and Ser. No. 664,551 filed April 5, 1933, for Driers and the combination thereof with drying oils, and catalytic agents.

The raw material for cativic acid and its derivatives is the exudate improperly called cativo or cativa or catteva "balsam" or "balsam resin", but should be properly called cativo resin.

This exudate is derived from the species of tree called *Prioria copaifera*, Gris. This tree is abundant in tropical and semitropical countries—for example, along the Caribbean coast of Panama and Costa Rica—especially in lowlands. This exudate when in its natural state is a greenish-brown, very tacky, exceedingly viscous liquid, opaque, and having, especially when heated, an unpleasant odor. While some attempts have been made to utilize it commercially, nothing has heretofore come of these efforts.

I have succeeded in isolating an acid from this resin, which acid constitutes the main part of the resin, being present in an amount from 70 to 75% of the total. This acid, to which I have given the name cativic acid, in its isolated and purified state totally differs from the raw material from which it is derived inasmuch as it is substantially colorless and odorless and thus it lends itself to numerous industrial applications for which the cativo resin would be entirely unsuited.

Furthermore, I have succeeded in producing a number of ester and other derivatives, either from cativic acid or directly from cativo resin, such derivatives being also substantially colorless and odorless and of such chemical and physical nature as to be exceptionally adaptable and useful for and in a number of various industrial applications.

Cativic acid can be prepared by subjecting cativo resin to vacuum distillation. The resin may be filtered before the vacuum distillation and if so it is advantageous to warm it in order to reduce its viscosity and make it more easily workable. When heating the cativo resin, it should be borne in mind that an elevated temperature tends to discolor cativic acid and also promotes the oxidation of same. Consequently, for all purposes where colorless and/or unoxidized material is preferable, if the material is subjected to heat, it should be done in an inert atmosphere, such as nitrogen or carbon dioxide.

When vacuum distillation is employed, it is not essential to first filter cativo resin but if desired the material may be subjected to vacuum distillation in the crude state in which it is obtained from the trees.

I have found that cativo resin contains about ½% water, 0.1% ash, up to 2% volatile oil, about ½% of an unidentified acid, which has a very much lower boiling point than cativic acid. The major constituent of cativo resin is cativic acid, as mentioned above, consisting of about 70-75% of the material. The balance of cativo resin, i. e., about 22% of the material, is a very viscous substance whose boiling point is so high that it exceeds the point of decomposition. As a result of my research as to the character of this substance, I have called it cativyl cativate, as my work indicates that it is an ester product of cativic acid and its corresponding alcohol, which alcohol was also isolated by me for the first time and to which the name cativyl alcohol has been given.

These determinations of the individual constituents, which have been made by me for the first time, enable one to readily obtain these constituents from the original cativo resin.

While various methods may be used, that of distillation will be described first.

In order to avoid the undue frothing, when heat is applied, due to the small amount of water present, the vacuum at the beginning should be kept low. I find that, for instance, by keeping the pressure at about 200 mm. of mercury and raising the temperature gradually, the water and the other lower boiling constituents, among them the odoriferous part, distill over smoothly. Of course the vacuum might be higher than hereby indicated, this being simply an example, and the pressure might be varied within a wide limit, according to conditions and personal preference. Everything, with the exception of cativic acid and cativyl cativate, distills over under 200° C., some of it very much lower, and at a pressure which may be as low as about 1 mm. All pressures in this disclosure are in millimeters of mercury, absolute. In this manner all the undesirable and foreign elements are eliminated. Now after changing receivers, the temperature may be raised to above 200° C., when cativic acid will distill over in a substantially colorless and odorless state. It should be borne in mind, however, that cativic acid, when distilled, fairly easily decomposes with a loss of $CO_2$ into its corresponding hydrocarbon which I designate as cativene. The higher the pressure, the readier the decomposition. Even at low pressures, such as 2 or 3 mm., there is a slight decomposition. At higher pressures, let us say 10 mm. or above, the decomposition will be fairly rapid. Consequently, in order to have as little decomposition as possible the pressure should be very low and the capacity of the pump sufficiently large to maintain it. A partial aid in maintaining these conditions is the insertion in the vacuum line of any chemical which will absorb carbon dioxide under the conditions. This decomposition is especially evident at the beginning of the distillation when great care must be exercised to keep the decomposition to a minimum. After the distillation of the cativic acid is under way, there is no further trouble in keeping the pressure constant, provided that the initial pressure was not too high. As cativene boils considerably lower than cativic acid, the boiling point of the hydrocarbon being about 160° C. at 3 mm., it will accumulate in the first distillate and it is generally preferable to isolate these relatively impure fractions from the later purer fraction. Cativic acid distills at about 228° C. at 6 mm. pressure. All boiling points in this disclosure are given in the actual uncorrected readings. They also will vary somewhat depending upon the rapidity of distillation,—a well-recognized fact in distillation procedure. As cativyl cativate does not distill under the conditions mentioned above, there is a sharp break in the distillation when all the cativic acid present has been distilled over. If the distillation has been properly conducted, the yield of distillate, consisting of cativic acid with some cativene, has been found to be between 70 and 75% of the cativo resin that has been used.

The accompanying hydrocarbon can be separated from cativic acid, if desired, by several methods, one having been indicated above and consisting of fractional vacuum distillation. Another method is the usual procedure of eliminating unsaponifiable matter from an acid, namely by making the alkali soap of the acid by neutralizing this acid with an alkali such as sodium or potassium hydroxide in an aqueous, alcoholic, or aqueous-alcohol solution, then shaking the solution out with solvent for the hydrocarbon which is immiscible with the soap solution, for instance petroleum ether. After this treatment, cativic acid in the separated soap solution can be liberated with an inorganic acid like HCl or $H_2SO_4$ or a strong organic acid like acetic acid. The cativic acid thus precipitated can be in turn taken up with a solvent thereof immiscible with water, and after evaporating this solvent in a non-oxidizing atmosphere pure cativic acid is obtained.

Cativic acid is a very viscous and tacky thermoplastic, which is colorless or substantially so and is nearly entirely odorless. All attempts at crystallization of cativic acid by me have so far failed, and as in the case of similar non-crystallized organic acids of high molecular weight, it is a very difficult matter to establish a precise chemical formula and absolute physical and chemical characteristics. It appears, however, to be a definite chemical compound, which may exist in one form, or as a mixture of isomeric forms, all having the same molecular formula, set forth below. Closely related compounds, having for example 2 carbon atoms more, or less, may be present in traces; these would be practically impossible to isolate and identify. This chemical compound, which may or may not be present in isomeric form, I refer to as cativic acid. A series of combustions on samples of purified cativic acid give a mean of 78.41% carbon, and 11.06% hydrogen. This corresponds to a molecular formula of $C_{20}H_{34}O_2$. It will be readily apparent that the exact molecular formula of a substance having such a high molecular weight cannot be readily determined. Hence this formula is advanced as being the most probable as far as I have been able to determine, and not as a positive and completely proved formula. The mean acid number was found to be 172.3. Cativic acid has an unsaturated, ethylenic bond, but the iodine number determinations according to Wij's method yield widely varying data according to the amount of sample taken, time of reaction, etc. Refractive index of a sample was found to be 1.507 at 15° C.; specific gravity 0.9987 at 23° C.; viscosity, 100 cc. pipette at 22° C., 78.5 hours (water under same conditions, 11.6 seconds).

Cativic acid exhibits the properties of a mono basic acid, readily forming salts. It also readily forms esters, differing from abietic and other resin acids, which latter esterify only with difficulty. Its composition in conjunction with the degree of unsaturation clearly differentiates it from the aliphatic acids. With a body of as high molecular magnitude as cativic acid, a small variation in percentage composition of hydrogen, oxygen and carbon produces a correspondingly greater apparent variation in composition, but from my researches, there is no compound of this composition or closely approaching the same which has the physical constants and other characteristics enumerated above and the ability to so readily esterify.

Cativic acid can be also prepared from cativo resin by shaking out the resin, or its solution in a solvent immiscible with water, with an aqueous, or possibly aqueous-alcoholic, alkali solution. As the solubilities of the alkali salts of cativic acid are rather limited, low concentrations of alkali should be used, a 2% alkali solution or even less being adaptable for this purpose. It should also be borne in mind that the alkali salts of cativic acid are easily precipitated by excessive alkali. By subsequent shaking out of the soap solution with immiscible solvents especially those which do not dissolve alkali soaps like petroleum ether or high-boiling aliphatic hydrocarbons, ethyl ether, etc., most of the unsaponifiable impurities still held in the soap solution can be eliminated. The soap solution can then be acidified and treated as described above to obtain cativic acid. If desired, the soap solution before acidulation, or the solvent solution after acidulation, may be decolorized.

I have found that cativic acid can be prepared by still another method in a desirably pure state by treating cativo resin with an approximately 75% alcoholic solution whereupon cativic acid goes into solution but the undesirable impurities remain as a bottom sludge. The alcoholic-aqueous solution may be poured off or filtered, and the cativic acid recovered therefrom in several ways. For instance, the alcohol solution may be distilled, or it may be diluted until the alcohol content is about 50% or less, the cativic acid becoming thereby substantially insoluble, part of it forming a layer and part remaining finely divided in suspension. If so desired, this insolubilized cativic acid may then be taken up in a solvent immiscible with the 50% aqueous alcoholic solution, such as petroleum ether or high-boiling, aliphatic hydrocarbons, and thus separated as one of the two resulting layers. Cativic acid then may be recovered from this solution by evaporation of the solvent, preferably in a non-oxidizing atmosphere. As a procedure alternative to this, the 75% alcoholic solution first mentioned above may be shaken out with an agent immiscible therewith which acts as a preferential solvent for cativic acid—for example, certain aliphatic hydrocarbons—part of the cativic acid going into the hydrocarbon solution. After the separation of the agent with its dissolved cativic acid (by decantation or the like), the 75% alcoholic solution containing some residual cativic acid may be used repeatedly for extraction of another portion of cativo resin. Cativic acid may be recovered as desired from the agent in which it is dissolved. Or, this solution may be used as such. The 75% alcoholic solution may be decolorized, or substantially so, if so desired, for instance, by adding sodium hydrosulphite in the amount of, for example, .2% of the total weight, shaking out for a while, possibly heating, and preferably filtering. Decolorization of cativic acid may be also accomplished by sunlight, which has an excellent decolorizing effect thereon, especially in solution.

Still another method of obtaining cativic acid consists in dissolving cativo resin in petroleum ether, preferably filtering the solution, and then leading anhydrous ammonia into the solution. After a short time, ammonia salt of cativic acid is precipitated in a gummy state and the supernatant petroleum ether containing the impurities may be poured off. The ammonia salt might be further washed by additional amounts of petroleum ether until the ammonium salt is sufficiently pure. If the mechanical contrivance used for this purpose is not sufficiently adaptable to yield cativic acid of the desired purity, the ammonium salt may be decomposed by an acid as indicated above and the freshly precipitated cativic acid ammoniated again in the petroleum ether solution, at which time impurities which have not been eliminated by the previous treatment will now remain in the petroleum ether and the then resulting ammonium salt will be pure, or substantially so. It should be pointed out that this behavior is entirely unusual for readily obtaining a pure acid of high molecular magnitude under the conditions outlined. I also wish to mention that when the ammonium cativate is further intensively mixed with petroleum ether as in centrifuging such a mass, it will yield a completely transparent, homogeneous mixture, readily flowable and containing an organic solvent with a high percentage of soap. The ammonium salt may be used as obtained above or it may be decomposed by acids and the cativic acid worked up as indicated above.

Cativic acid is insoluble in water but entirely soluble in all the common organic solvents such as aliphatic or aromatic hydrocarbons, alcohols, ketones, esters, ethers, chlorinated solvents, etc.

I have found that cativic acid yields esters when esterified with alcohols. These artificial esters had not, to my knowledge, been produced prior to my invention and are therefore regarded as new chemical compounds which are comprised within the scope of this invention. I have found that these new artificial esters possess valuable and unique properties which constitute them valuable and useful industrial products, and which are described more in detail below.

I have found that cativic acid can be esterified with ease, according to usual methods of esterification, as for example, with small amounts (for instance 2%) of $H_2SO_4$ or $HCl$. The esters may be prepared directly from cativo resin, by adding the respective alcohol to the resin and small amounts of mineral acid. The esterification takes place quickly and may be further hastened by heating. The mineral acid and the excess of alcohol form a layer immiscible with the ester and are thus separated; or they may be washed out by water, or the whole reaction product may be distilled and the alcohols, boiling very much lower than the corresponding cativic acid esters, may be separated by distillation either at atmospheric pressure or in vacuum. If it is so desired, any small amount of un-esterified cativic acid may be eliminated from the reaction mixture by neutralizing same with an alkali, such as caustic soda (which will, of course, first neutralize the acid catalysts), and washing out the soap with water or preferably (to avoid any hydrolysis) with an aqueous-alcoholic mixture containing approximately 50% alcohol.

For the preparation of those esters, like glyceryl cativate or triethylene glycol cativate, which cannot be distilled in the usual vacuum used commercially, in order to obtain a pure product, free of the original ester and coloring matter present in the cativo resin, cativic acid is prepared at first by any of the methods described above, then the high boiling alcohol is added and the mixture heated until the reaction is completed. If the reaction temperature is higher than the boiling point of the alcohol, the esterification should be carried out in a closed vessel under pressure. In this instance it is advantageous to suspend above the reaction mixture an agent, like CaO, which absorbs the water formed, but does not react with the refluxing alcohol. By thus removing one of the products of reaction, the progress of the reaction in the proper direction is, of course, promoted. For the preparation of these esters the reaction temperature of which is relatively high, an arrangement is suitable which will permit the evaporation of the water formed by the reaction and eliminate it from the reaction mixture and, at the same time, permit refluxing the alcohol used for esterification. In order to obtain a light colored ester, the esterification is advantageously carried out in a non-oxidizing atmosphere, viz., in nitrogen, hydrogen, etc. This method of esterification may be hastened by the addition of aluminum or zinc, or their derivatives, as is the case in the preparation of other similar esters by the same method.

The esters of cativic acid range from slightly viscous liquids to sticky thermoplastic resins exhibiting slow cold flow. If properly prepared they will be entirely or substantially colorless and odorless. As a general rule they are soluble in all the ordinary solvents and only a few of them are insoluble or poorly soluble in the lower alcohols like methyl and ethyl alcohol. These esters are compatible and/or solvents for a great variety of chemicals and products, and are most useful ingredients in compounding a great number of commercial preparations. Their usefulness for instance in the cellulose ester and ether arts is manifold, some of them being gelatinizers, others non-solvent softeners. Some boil at a very high temperature; others cannot be distilled at all. They are all substantially color-stable to ultra violet light and are unaffected by cold water and substantially so by boiling water. Compositions of cellulose esters or ethers with most of them are unaffected by lower alcohols. The incorporation of most of these cativic esters in cellulose esters and ethers give an excellent adhesion to glass, metal, paper, textiles, etc. to these compounded products. The nitrocellulose films for instance admixed with cativic esters result in products having excellent clarity, gloss and tensile strength, the films being dry, non tacky, non spewing, even after the addition of such large amounts as 125 per cent of these esters to the cellulose base.

Dopes prepared from nitrocellulose and cativic esters have low viscosities, permitting the use of lacquers of high solids content, are free flowing and quick leveling, and free from orange peel. As the esters are miscible with all the solvents commonly used in the cellulose arts they facilitate the compounding of the dopes, and also enable the practitioner to use low cost solvents. Furthermore, as these esters may be easily prepared with very low acid numbers, they are suitable vehicles in the preparation of pigment pastes; even the basic type pigments will not cause any jelling or livering. As the cativic acid esters are tasteless, substantially odorless and non toxic, the cellulose products prepared with them may be used for lacquers to be in contact with foodstuffs. These esters are compatible with most of the resins used in cellulose arts, and thus may be advantageously used in combination with such resins to bring about modifications in the characteristics of the resulting films or product. The esters are substantially non oxidizable under ordinary conditions of use, and hence do not become brittle, even after long exposure to ultra violet light. Compositions of cellulose esters or ethers and cativic acid esters are likewise stable to ultra violet light. As most of them have excellent waterproofing qualities, the incorporation of the esters insures a high degree of durability of the compounded cellulose products. Films prepared by the incorporation of cativic esters with cellulose esters or ethers dry as fast as, or in some cases even faster than, films prepared with other commonly used resins, resin-plasticizers, or plasticizers. In addition to their applicability in connection with compounds and derivatives of cellulose, these cativic acid esters are useful agents for a wide field of processes such as coating, impregnating, water-proofing, plasticizing, etc., both alone and in connection with other substances.

To illustrate valuable points I shall enumerate some of the synthetic esters of cativic acid prepared and studied by me. Methods by which these esters are prepared are included in detail.

It will be evident from statements hereinbefore made, as well as from the examples to follow, that variations in the procedure for esterification are permissible. These variations, however, are in details only and there is no fundamental difference between the various examples. Each particular example happens to be a preferred way of making the particular ester described thereunder, but considerable choice in procedures is permissible as will be evident from a study of this disclosure. Differences between the examples are due primarily to differences in boiling points and solubilities of the ingredients and products, with the accompanying necessity for different procedures for distilling and separating.

*Methyl cativate.*—To cativo resin an excess of methyl alcohol is added and if so desired the resulting solution may be filtered, but this is not essential. After the addition of a small amount of concentrated acid, such as $H_2SO_4$, let us say 2% of the weight of cativo resin used, a practically immediate formation of two layers may be observed. Some part of the ester is formed practically instantaneously. In order to complete the esterification, the reaction mass is heated and refluxed for, let us say, 2 hours. There is a fast separation into two layers, the lower layer containing the ester with a small amount of methyl alcohol, the upper layer the excess of methyl alcohol with $H_2SO_4$. The lower layer may be drawn off and if so desired washed once or twice with a small amount of methyl alcohol in order to eliminate the last parts of $H_2SO_4$, still present in the ester. The still unesterified cativic acid might be eliminated by the addition of alkali either in aqueous or alcoholic solution until phenolphthalein or any other suitable indicator will show the presence of an excess of alkalinity. Of course this neutralization shall be preferably done while the ester is cold otherwise the neutralization of cativic acid might be accompanied by the simultaneous partial saponification of the ester already formed. In case the cativic acid has been saponified, the soap may be washed out with water or a mixture of water and alcohol. Now the reaction mass contains not only methyl cativate but also the coloring matter present originally and also formed during the esterification, and the original ester, cativyl cativate, present in cativo resin. The pure methyl cativate may be readily obtained by vacuum distillation.

Cativic acid may replace the cativo resin as the source of the acid, if desired. In such an event the procedure will be the same as that just described, except for obvious differences (as in materials to be separated, for instance). However, this involves the extra step of making cativic acid, which would preferably be avoided in commercial operations at least.

Methyl cativate prepared by the methods described above is a substantially odorless and colorless slightly viscous liquid. Characteristics of a representative sample are: boiling point 210–211° C. at 15 mm. pressure; sp. gr. 0.9739 at 20° C.; viscosity, 55 cc. pipette at 23.5° C., 170.6 seconds (water under same conditions, 17.8 seconds).

Methyl cativate is compatible with nitrocellulose even to the extent of 100 parts of nitrocellulose and 200 parts of methyl cativate, such films being clear, very flexible, and having an excellent gloss. A film compounded from equal parts of nitrocellulose and methyl cativate, for instance, has a good adhesion to glass, metal, etc. and is clear, non-tacky, soft, and glossy.

*Ethyl cativate.*—This is prepared in accordance with the methods described for making methyl cativate. It is substantially colorless and odorless, and is a limpid liquid, boiling at about 210–211° C. at 8 mm. pressure. A representative sample shows: sp. gr. 0.9760 at 20° C.; viscosity, 50 cc. pipette, at 23.5° C., 177.8 seconds; refractive index 1.4910 at 22.5° C. Ethyl cativate is insoluble in water, and miscible with aliphatic and aromatic hydrocarbons, ethers, ketones, esters, etc.

*Normal butyl cativate.*—Normal butyl cativate may be prepared by mixing cativo resin with an excess of butyl alcohol and say, 2% concentrated sulphuric, hydrochloric or other strong acid, calculated on the weight of the cativo resin. The mixture is refluxed for two hours; then the mineral acid used is neutralized, for example, with a slight excess of calcium carbonate. Advantageously, it may be filtered at this point. Then, if so desired, any still-unesterified cativic acid may be neutralized with an aqueous or alcoholic alkali solution, let us say of a strength of 1%, and the soap solution washed out with water or aqueous-alcohol. As the soap itself is stable at the boiling point of the cativic acid ester, it may be left in the reaction mixture without eliminating it, but then it should be borne in mind that while distilling the alcohol and/or water, the soap solution might foam and thus might make the distillation, due to the possible over-foaming, more difficult. The whole reaction product with or without the soap, or with or without the unesterified and admixed cativic acid, is subjected to vacuum distillation. Water, any excess butyl alcohol and any impurities distill off at comparatively low temperature, all of them under 200° C. in the neighborhood of 20 mm. pressure. When this point is reached the receiver is changed, and the butyl cativate is distilled off. If the cativic acid was not previously eliminated, as described above, some part of it is liable to contaminate the butyl ester and, as the cativic acid at the distillation may decompose into the hydrocarbon to some extent, this hydrocarbon is then also present in the butyl ester. As the hydrocarbon boils very much lower than the butyl ester, a fractionated distillation will eliminate this contamination from the major part of the distillate. Normal butyl cativate is an essentially colorless and odorless limpid liquid, boiling at about 201–202° C. at 2½ mm. pressure. A sample prepared as above described shows: sp. gr. 0.9511 at 20° C.; viscosity, 50 cc. pipette at 23.5° C., 129.6 seconds. (Water under same conditions 17.8 seconds); refractive index 1.4870 at 22.5° C. Normal butyl cativate is insoluble in water, and soluble in methyl and ethyl alcohols, and methyl-ethyl ketone. It is miscible with propyl and butyl alcohols, ethyl ether and petroleum ether, acetone, aliphatic and aromatic hydrocarbons and esters. It has excellent compatibility with nitrocellulose and ethyl cellulose, even as much as 200 parts of butyl cativate admixed with 100 parts of nitrocellulose yielding a film which has only a trace of tackiness. A film of equal parts of nitrocellulose and normal butyl cativate is dry, soft, has good adhesion to metal, glass, etc.

*Iso amyl cativate.*—This may be prepared in the manner described for normal butyl cativate. It distills at about 221° C. at 3½ mm. pressure. Its acid number, for instance, is less than 3. It is a substantially colorless and odorless slightly viscous liquid insoluble in water, methyl or ethyl alcohol, but miscible in aliphatic and aromatic hydrocarbons, esters and ketones. It is compatible to quite an extent with nitrocellulose, a film consisting of equal parts of nitrocellulose and iso amyl cativate being non-tacky, and clear.

*"Cellosolve" cativate. (Cativic acid ester of ethylene glycol monoethyl ether).*—"Cellosolve" cativate may be prepared by dissolving cativo resin in excess of "Cellosolve" (which is a tradename for ethylene glycol monoethyl ether) and leading anhydrous HCl gas into it with or without previous filtration of the reaction mass. Other strong acid catalysts may be used instead of HCl. As the reaction mass is very viscous, it is advantageous to have it well stirred, or to employ more "Cellosolve", or to use a non-reacting additional solvent, preferably of low viscosity such as acetone or petroleum ether. The HCl gas may be led into the mixture at a low temperature while immersing the reaction mixture in an ice bath and then towards the end of esterification raising the temperature, or one may proceed by esterifying at a relatively high temperature, above the boiling point of the water but below the boiling point of the "Cellosolve". In this manner the HCl gas will carry with it the water formed and eliminating thus the water of the reaction, facilitate the quick and more thorough formation of the ester. After the esterification is completed, in case the water was not eliminated as above described, there are two layers present. The lower layer is the aqueous-HCl layer, and the upper layer is the ester layer. This upper layer may, with or without filtration, be subjected to vacuum distillation and after the "Cellosolve" and the other impurities still present in this layer are distilled over, the "Cellosolve" ester of cativic acid distills at a much higher temperature and may be so separated in a pure or nearly pure state. One may also proceed by subjecting the whole reaction mass after esterification to vacuum distillation and everything that goes over below 200° at 20 mm. pressure or thereabouts is rejected or recovered separately, and then the "Cellosolve" ester is obtained at a temperature specified below (i. e. about 224° C. at 2½ mm.). Another modification for recovering the esterified reaction product lies in washing out the excess "Cellosolve", and the HCl, with water. When sufficient amount of water is admixed with the reaction mass to counteract the solvent action of the "Cellosolve" on the ingredients, the resulting "Cellosolve"-water mixture will dissolve only negligible amounts of ester. The two layers may be separated and the ester layer washed anew if so desired. In this, and in the other cases described in this application, it should be borne in mind that a number of these cativic acid esters have a specific gravity near to that of water which fact often results in emulsion, when washings with water are attempted, such emulsions breaking after a time and not very sharply. For avoiding such an occurrence it is advantageous to add some alcohol or other similar water-miscible chemical of low specific gravity. "Cellosolve" cativate is a colorless, odorless liquid, boiling at about 224° C. at 2½ mm. pressure. A representative sample shows: sp. gr. 0.9748 at 20° C.; viscosity, 50 cc. pipette at 23.5° C., 143.4 seconds (water under the same conditions 17.8 seconds). refractive index 1.4854 at 22.5° C.; ester number 149.4. "Cellosolve" cativate is insoluble in water and miscible with all the common solvents. It is excellently compatible with nitrocellulose and ethyl cellulose. A film containing 200 parts of "Cellosolve" cativate and 100 parts of nitrocellulose is clear, soft and only slightly tacky. A film containing equal amounts of these two constituents is clear, dry and non-tacky and has very good adhesion to glass, metal, etc.

*Methyl "Cellosolve" cativate (Cativic acid ester of ethylene glycol monomethyl ether).*—This is prepared in the same way as "Cellosolve" cativate. It is a substantially colorless and odorless liquid, boiling at 243° C. at 5½ mm. pressure. A representative sample shows: sp. gr. 0.9833 at 20° C.; viscosity, 50 cc. pipette at 23.5° C., 167.6 seconds (water under same conditions 17.8 seconds); refractive index 1.4897 at 24° C.; ester number 150.8. Methyl "Cellosolve" cativate is insoluble in water, and miscible with common organic solvents. It has a gelling action on nitrocellulose, and excellent compatibility therewith. A film, for instance, compounded of equal proportions of nitrocellulose and methyl "Cellosolve" cativate is clear, dry, soft and non-tacky, having high tensile strength, and good adhesion to glass, metal, etc.

*Butyl "Cellosolve" cativate (Cativic acid ester of ethylene glycol monobutyl ether).*—This ester may be prepared by dissolving cativo resin in an excess of butyl "Cellosolve", and esterifying with a small amount of concentrated sulfuric acid. After the esterification is completed, the sulfuric acid and the still unesterified cativic acid are neutralized, the ester layer mechanically separated, and then vacuum distilled. Of course, the process might be modified by any of the other suitable variants, mentioned in the preparation of other esters herein described. The butyl "Cellosolve" cativate thus obtained is a substantially colorless and odorless viscous liquid. It distills at about 240° C. at 2½ mm. pressure. A representative sample shows an acid number of zero. It is insoluble in water, and completely soluble in ethyl alcohol, acetone, toluene and high-boiling aliphatic hydrocarbons, among others. It is compatible with nitrocellulose and ethyl cellulose. A film, for instance, compounded of equal proportions of nitrocellulose and butyl "Cellosolve" cativate is clear, non-tacky, moderately soft, dry, having good gloss and high tensile strength, and excellent adhesion to glass.

*Ethylene glycol cativate.*—This is prepared from ethylene glycol in the same way as the "Cellosolve" cativate just described is a substantially colorless and odorless, very viscous liquid. A sample on analysis showed: sp. gr. 1.0366 at 20° C.; viscosity, 25 cc. pipette at 200° F. 158 seconds (water under same conditions 11.4 seconds); refractive index 1.5130 at 22.5° C. It is insoluble in water, slightly soluble in methyl and ethyl alcohols, soluble in propyl and butyl alcohols, methyl, ethyl, propyl and butyl esters, ethyl ether and petroleum ether, acetone and methyl ethyl ketone. It is very soluble in aliphatic and aromatic hydrocarbons.

*Glyceryl cativate.*—This product is prepared by heating cativic acid with glycerine (slightly in excess if desired), preferably in a non-oxidizing atmosphere and in presence of aluminum. This reaction may be made at atmospheric pressure, or above or below. It is somewhat more satisfactory to perform this reaction in a vacuum as the still-present foreign constituents like the excessive glycerine or possibly small amounts of cativene can thus be completely eliminated without any darkening or decomposition of the glyceryl ester formed. For an illustrating example, we shall describe herein the reaction under these conditions. A pressure, let us say 150 to 250 mm. is used, the reactants are heated up and the reaction starts at about 200° C., the water formed by the esterification distilling off. The temperature is slightly raised and the reaction is finished in approximately 3 hours. The final temperature might be 250° or even somewhat higher. Then the pressure is carefully lowered so as to enable the distillation of the admixed products but to prevent the sudden foaming over. Everything distills over except the glyceryl cativate which remains in the reaction vessel and after some cooling in a non-oxidizing atmosphere, may be taken out therefrom. Glyceryl cativate is colorless or light yellow, odorless, semi-solid. Tests on a sample showed: sp. gr. 1.0537 at 20° C.; viscosity, 25 cc. pipette at 250° F., 1850 seconds. (Water under same conditions 11.4 seconds); refractive index 1.5135 at 22.5° C. It is insoluble in water and methyl alcohol; slightly soluble in ethyl alcohol; soluble in propyl and butyl alcohols, methyl and butyl acetates, ethyl and petroleum ether, toluene and xylene. It is very soluble in ethyl and propyl acetate, acetone and methyl ethyl ketone, benzene and higher-boiling aliphatic hydrocarbons. A film containing for instance equal parts of nitrocellulose and glyceryl cativate is clear, non-tacky and soft. It has excellent adhesion to glass, metal, etc.

*Mixed acetic and cativic acid ester of glycerine.*—This product is prepared by mixing, for instance, 100 pounds of cativic acid and 36 pounds of acetine, which has a saponification number of 529 and thus contains mono- and di-acetine in about equal proportions. This is heated in the presence of aluminum or in an aluminum lined vessel in a non-oxidizing atmosphere, at approximately 250 mm. pressure. The reaction starts under 200° C., the temperature being raised slightly and 250° C. being reached in about 3 hours at which time the reaction is completed. Then the vacuum is raised, and the excess of acetine (with any cativene present) is distilled off. The remaining reaction product, the combined acetic and cativic acid ester of glycerine has an acid number of about 2, is a light yellow, practically odorless, exceedingly viscous liquid which cannot be distilled under the usual vacuum. It is not soluble in water or alcohol, but soluble in aliphatic and aromatic hydrocarbons, esters, and ketones. It has excellent compatibility with nitrocellulose. A film, for instance, containing 2 parts of this mixed cativic acid ester and 1 part of nitrocellulose is clear, non tacky, very soft, and has a brilliant gloss. It has remarkable adhesion to glass, metal, etc.

*Mixed ester of cativyl cativate and glyceryl cativate.*—This product is prepared by preferably filtering cativo resin by itself or in a solvent, then preferably adding a slight excess of glycerine calculated to neutralize the cativic acid present in the cativo resin. Then the product is heated and the reaction performed as described under glyceryl cativate. The other impurities present in cativo distill over and there remains behind a transparent, brown, semi-solid, which may be, if so desired, subsequently decolorized. The acid number obtained was less than 3. This ester is not soluble in water and only partially in ethyl alcohol and almost completely in acetone. It is miscible with the aliphatic and aromatic hydrocarbons and esters.

*Triethylene glycol cativate.*—This ester may be prepared as described above for glyceryl ester, or mixed glycerine ester of acetic acid and cativic acid, namely by heating cativic acid with triethylene glycol without an acid catalyst. The resulting product is a substantially colorless and odorless, exceedingly viscous liquid. A representative sample of triethylene glycol cativate thus prepared was found to have an acid number of 1. It is insoluble in water, practically insoluble in ethyl alcohol, and completely soluble in acetone, toluene and high-boiling aliphatic hydrocarbons, and certain other solvents. It has an excellent compatibility with nitrocellulose and ethyl cellulose. For instance, a film composed of 2 parts of triethylene glyceryl cativate and 1 part of nitrocellulose is clear and soft. A film composed of equal parts of these two constituents is clear, non tacky, soft and has excellent adhesion to glass, metal, etc.

The foregoing are certain illustrations of esters of cativic acid, which esters are referred to as artificial esters, since they result from the esterification of the cativic acid component of cativo resin with alcohols which are derived from other sources than cativo resin and since they do not occur naturally either in cativo resin or in any other known substance. While illustrations of artificial esters of cativic acid have been given, it is to be understood that the artificial esters of cativic acid within the scope of this invention are not limited to the illustrations that have been given. However, from the illustrations given the production of other artificial esters can be readily accomplished by anyone desiring to practice this invention.

As distinguished from the artificial esters of cativic acid above mentioned, I have found, as above mentioned, that cativo resin contains a unique substance which is believed by me to be an ester and which I have called cativyl cativate. Cativyl cativate is, when obtained in a pure or substantially pure state, totally different from the resin. It may be obtained by filtering cativo resin with or without dissolving it, and then neutralizing the acids present in the cativo resin. Subsequently the alkali salts so obtained may be washed out with water or aqueous alcohol leaving behind cativyl cativate plus volatile oil present in cativo resin.

If so desired, this volatile oil may be eliminated in several ways, as, for instance, by vacuum distillation. It distills under 200° C. at the neighborhood of 10 mm. pressure, while cativyl cativate is unaffected under these conditions. It may be also eliminated by steam distillation, the volatile oil distilling more difficultly under this treatment than the usual terpenes. After any of these treatments, cativyl cativate remains behind as a brown, very viscous liquid, but the viscosity of it is visibly less than that of cativo resin. Furthermore, while cativo resin is opaque, and has an objectionable odor and high acid number, cativyl cativate, as obtained in any of the processes just described, is transparent, substantially odorless or having a slight pleasant odor, and either neutral or nearly so. In this manner a product is obtained by these chemical and physical manipulations that is unknown in the natural state, and the improvements in the characteristics of the purified product enable it to be used for purposes for which the natural product could not possibly come into consideration. For instance, cativyl cativate purified in the above manner may well be used as plasticizer for paints, containing even basic pigments, for which the cativo resin with its high acid number could not be used.

The unique characteristics of both the esters themselves and of nitrocellulose films in which these esters are incorporated make them particularly suitable for a number of practical commercial applications.

The esters are for the most part compatible with nitrocellulose and cellulose ethers in high proportions and are preferably added to part of the lacquer solvent or diluent to facilitate mixing or they may be added to the base lacquer directly without admixture with solvent. In addition to maintaining a high solids content in the mixture by this feature, the esters have the additional property of decreasing the viscosity of the base lacquers to which they may be added, which fact again permits of even greater solids content than is obtained with materials combining the action of both plasticizer and resin for nitrocellulose.

Such films are further characterized by extreme flexibility combined, in certain of them, with good tensile strength and freedom from tackiness and printing. These flexible films are furthermore resistant to changes by exposure to ultra violet light or sunlight and hence remain permanently flexible over long periods of time.

The adhesion to metal, glass, paper, textiles, etc. of lacquers in which these esters have been incorporated is in most instances very excellent. This fact alone would not be unique except for the exceedingly flexible characteristics which they simultaneously impart to the films.

The esters are suitable media for the grinding of pigment pastes. Their value in this connection, however, resides in the fact that the esters may be prepared with such low acid numbers that even pigments of a basic nature may be used without danger of interaction and resultant thickening or livering of the vehicle.

The color of the esters may vary from water white to yellow depending largely upon the care in the preparation of both the acid and the ester made therefrom. With due care in their preparation the lower molecular weight esters will be almost water white, while those of highest molecular weight will usually be light yellow.

The esters of cativic acid are not appreciably affected in color by long exposure to ultra violet light. Although they increase somewhat in viscosity during such exposure none of them, except glyceryl cativate, exhibit any surface hardening or drying, all of them retaining their fluidity and tackiness. This property permits of their use in white and light colored lacquers and clear lacquers for application over white or light colored surfaces.

Although most of these esters do not gel nitrocellulose they have the distinctive advantage over the vegetable oil softeners in not sweating to the surface of the film at elevated temperatures in addition to imparting high gloss and adhesion which these oils lack.

Their low vapor pressures even at very high temperatures, and their stability to light, insure the permanency of flexibility of films comprising them.

Also, in contrast to lacquers prepared from nitrocellulose with many materials which act as a resin and/or softener therewith, the cativic acid esters do not substantially retard the evaporation of solvent from nitrocellulose films containing them even at high ratios of ester to nitrocellulose. Films deposited by spraying likewise exhibit no marked tendency to orange peel even from solutions prepared with highly volatile organic solvents and diluents.

As some of the esters are insoluble in alcohol, lacquer films in which they have been incorporated exhibit marked resistance to it, varying with the amount of such esters so incorporated. This is a characteristic of all films of nitrocellulose and alcohol resistant materials. But while most of the films prepared with any of the esters of cativic acid will be slightly softened by alcohol immersion, none of them turn white or blush to any appreciable extent on such immersion. It is important, however, in making such tests to be certain that all of the solvent has been removed from the film under test, otherwise an erroneous indication of blushing may result. All of the films when free of solvent are water resistant.

The almost complete absence of odor, taste and color associated with lacquer films in which these esters have been incorporated make them especially adaptable to uses in connection with wrappers, containers or lining, for food containers, likewise for many other uses where any one or all of these features may be a factor in their selection.

Esters of cativic acid with nitrocellulose or cellulose ethers have practical applications as adhesives, for making artificial leather, as flexible coatings for paper and textiles, lacquers for wood and metal, enamels, and many other purposes. These uses of cativic acid esters are not confined to their association with cellulose derivatives. The esters find use, for example, as plasticizers in various coating compositions, such as shellac; with adhesive compositions of several kinds, and as agents for improving the resistance to water of many materials which otherwise have inadequate water-resistance. Cativic acid as such or in the form of certain esters such as the glyceryl ester finds use as a plasticizer and/or modifying agent for glycerol-phthalic anhydride resins.

As a specific example I will describe the preparation of a lacquer which will be satisfactory as a flexible coating for a starch-sized textile and will provide good adhesion, gloss, flexibility, and protection to the size without appreciable stiffening of the fabric. The degree of waterproofing afforded the textile will depend largely on the amount and method of application thereto.

The following ingredients:

| | Parts |
|---|---|
| 15 percent solution of 5 second nitrocellulose in suitable solvents for same | 100 |
| Methyl ester of cativic acid | 22.5 to 30 | are mixed and diluted to the viscosity desired. Without dilution the above proportions will yield a viscous dope suitable for application by coating bars or the like.

In my copending application, Serial No. 664,551, filed April 5, 1933, I describe heavy metal salts of cativic acid and methods of making them. As one method, I mention that wherein cativic acid either alone or as an ingredient of another substance such as cativo resin, is taken up with a suitable solvent such as one of the high-boiling aliphatic hydrocarbons generally used as solvents, and then treated with a finely-divided compound of the desired metal in the presence of heat and agitating means. The compound of the metal may be an oxide, hydroxide, acetate, etc. The solvent should preferably also be a solvent for the metal cativate produced, which latter is thus separated in its solvent from the inorganic reactants, and may then be used as such in solution or else recovered as the metal salt free from solvent.

The esters of cativic acid have been mentioned above as plasticizers and for several other purposes. A further example of their usefulness along these lines is with the metal cativates. With aluminum cativate, for instance, they act as plasticizers. Aluminum cativate has the property, unusual among aluminum compounds, of forming a clear, transparent film. This film, however, is brittle and relatively inflexible; but by the use of a suitable ester of cativic acid the film may be plasticized as desired. The ester used, and the amount, will depend of course upon the degree of plasticity desired, and may be selected from among those already described in detail in accordance with the properties given. The ester and the metal cativate are merely mixed, with the aid of suitable common solvents, and the solution then filmed or sheeted out in accordance with ordinary practice. Other materials such as nitrocellulose may be added. Thus, three parts nitrocellulose and two parts each of aluminum cativate and glyceryl cativate, mixed with the aid of common solvents and sheeted, form a clear, transparent, colorless film.

When I refer to "alcohol" in the claims, it should be understood of course (as is evident from the examples and other statements in the specification) that I am not limited merely to simple alcohols. Complex alcohols, polyhydric alcohols, aromatic, and aliphatic, and substituted alcohols can be used; the criterion being that the compound shall contain one or more esterifiable —OH groups, i. e., groups which will unite with the —H of the acid group (—COOH) of organic acids to form water, whereby simultaneously an ester is formed from the acid and the alcohol.

I claim:

1. A process comprising reacting cativic acid with an alcohol to form an ester of cativic acid.

2. A process comprising separating cativic acid occurring in cativo resin from a substantial proportion of the other ingredients of said resin, and then reacting the separated cativic acid with an alcohol to form an ester of cativic acid.

3. A process comprising treating cativo resin containing cativic acid with an alcohol, whereby the alcohol reacts with the cativic acid to form the corresponding ester of cativic acid, and thereafter separating said corresponding ester from a substantial proportion of the substances other than said ester.

4. Process according to claim 1, further characterized in that the reaction is carried out in a non-oxidizing atmosphere.

5. The cativic acid ester of an aliphatic alcohol.

6. Glyceryl cativate.

7. Cativic acid ester of ethylene glycol monomethyl ether.

8. Cativyl cativate separated from a substantial proportion of other ingredients of cativo resin.

9. Process for preparing esters, comprising reacting cativic acid with an aliphatic alcohol.

10. Process for preparing esters, comprising reacting cativic acid with an alcohol in the presence of a strong, non-oxidizing mineral acid.

11. An ester of cativic acid separated from a substantial proportion of other constituents of cativo resin.

12. An ester of cativic acid which is distillable without appreciable decomposition at a pressure of 1 millimeter of mercury or greater.

NICHOLAS L. KALMAN.